(12) United States Patent
Kanai

(10) Patent No.: US 6,615,087 B2
(45) Date of Patent: Sep. 2, 2003

(54) SUPERVISORY CONTROL APPARATUS

(75) Inventor: Yoshihiko Kanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/320,781

(22) Filed: Dec. 5, 2002

(65) Prior Publication Data
US 2003/0088319 A1 May 8, 2003

Related U.S. Application Data

(63) Continuation of application No. PCT/JP00/04695, filed on Jul. 13, 2000.

(51) Int. Cl.[7] .............................................. G05B 15/02
(52) U.S. Cl. ........................ 700/9; 700/19; 700/20; 700/86; 700/89; 700/87; 340/3.1; 340/3.9; 340/3.43; 340/3.44
(58) Field of Search .......................... 700/9, 10, 18–19, 700/20, 23, 86–88, 89; 340/3.1, 3.2, 3.3, 3.4–3.44, 3.9

(56) References Cited

U.S. PATENT DOCUMENTS 5,535,406 A * 7/1996 Kolchinsky ................... 712/10
6,411,806 B1 * 6/2002 Garner et al. ............... 455/428
6,459,938 B1 * 10/2002 Ito et al. ......................... 700/9
6,510,349 B1 * 1/2003 Schneck et al. ............... 700/9
6,526,323 B1 * 2/2003 Miyajima et al. .............. 700/9
6,529,780 B1 * 3/2003 Soergel et al. ................ 700/10

FOREIGN PATENT DOCUMENTS

JP    3-265325    11/1991

* cited by examiner

Primary Examiner—Ramesh Patel
(74) Attorney, Agent, or Firm—Katten Muchin Zavis Rosenman

(57) ABSTRACT

A supervisory control apparatus in which events that occur in the individual sections of equipment or a system having a hierarchical structure are identified and used for its maintenance and operation. To increase the efficiency and the flexibility of supervisory control without altering the hardware configuration. For this purpose, the apparatus provides a supervisory control apparatus in which immediately lower-rank components to which an event that has occurred in each of a plurality of components may spread are registered in advance. A particular status that an event occurred in a higher-rank component has spread to all lower-rank components is individually registered based on an iterative algorithm. An event occurred in a component where such a particular status is registered is negated.

34 Claims, 14 Drawing Sheets

FIG. 3A

| | ELEMENT CLASS | ELEMENT IDENTIFIER | REPERCUSSION DESTINATION IDENTIFIER | STATUS WORD | | | | REPERCUSSION SOURCE IDENTIFIER | RECOVERY TIME | EXTENSION CONDITION | NUMBER OF TIMES |
|---|---|---|---|---|---|---|---|---|---|---|---|
| | | | | F | f | W | w | | | | |
| | 1 | A | C,D | 0 | 0 | 0 | 0 | | | | |
| | 1 | B | E,F | 0 | 0 | 0 | 0 | | | | |
| | 1 | C | H,I | 0 | 0 | 0 | 0 | | | | |
| | 1 | D | I,J | 0 | 0 | 0 | 0 | | | | |
| | 1 | E | J,K | 0 | 0 | 0 | 0 | | | | |
| | 1 | F | L | 0 | 0 | 0 | 0 | | | | |
| (1) | 1 | G | L,M | 0 | 0 | 1 | 0 | | 17:00 | | |
| | 1 | H | X | 0 | 0 | 0 | 0 | | | | |
| | 1 | I | X | 0 | 0 | 0 | 0 | | | | |
| | 1 | J | X | 0 | 0 | 0 | 0 | | | | |
| | 1 | K | Y | 0 | 0 | 0 | 0 | | | | |
| (2) | 1 | L | Y | 0 | 0 | 0 | 1 | G | 17:00 | | |
| (2) | 1 | M | Y | 0 | 0 | 0 | 1 | G | 17:00 | | |
| | 2 | X | – | 0 | 0 | 0 | 0 | | | | |
| (2) | 2 | Y | – | 0 | 0 | 0 | 1 | G | 17:00 | | |

| | ELEMENT CLASS | ELEMENT IDENTIFIER | REPERCUSSION DESTINATION IDENTIFIER | STATUS WORD | | | | REPERCUSSION SOURCE IDENTIFIER | RECOVERY TIME | EXTENSION CONDITION | NUMBER OF TIMES |
|---|---|---|---|---|---|---|---|---|---|---|---|
| | | | | F | f | W | w | | | | |
| | 1 | A | C,D | 0 | 0 | 0 | 0 | | | | |
| | 1 | B | E,F | 0 | 0 | 0 | 0 | | | | |
| | 1 | C | H,I | 0 | 0 | 0 | 0 | | | | |
| (1) | 1 | D | I,J | 1 | 0 | 0 | 0 | | | | |
| | 1 | E | J,K | 0 | 0 | 0 | 0 | | | | |
| | 1 | F | L | 0 | 0 | 0 | 0 | | | | |
| (1) | 1 | G | L,M | 1 | 0 | 1 | 0 | | 12:00 | | |
| | 1 | H | X | 0 | 0 | 0 | 0 | | | | |
| (2) | 1 | I | X | 1 | 1 | 0 | 0 | | | | |
| (2) | 1 | J | X | 1 | 1 | 0 | 0 | | | | |
| | 1 | K | Y | 0 | 0 | 0 | 0 | | | | |
| (2) | 1 | L | Y | 1 | 1 | 0 | 1 | G | 12:00 | | |
| (2) | 1 | M | Y | 1 | 1 | 0 | 1 | G | 12:00 | | |
| (2) | 2 | X | – | 0 | 1 | 0 | 0 | | | | |
| (2) | 2 | Y | – | 0 | 1 | 0 | 1 | G | 12:00 | | |

31, 31A, 31B, 31C

F I G. 4

| | ELEMENT CLASS | ELEMENT IDENTIFIER | REPERCUSSION DESTINATION IDENTIFIER | STATUS WORD | | | | REPERCUSSION SOURCE IDENTIFIER | RECOVERY TIME | EXTENSION CONDITION | NUMBER OF TIMES |
|---|---|---|---|---|---|---|---|---|---|---|---|
| | | | | F | f | W | w | | | | |
| (2) | 1 | A | C,D | 0 | 0 | 0 | 0 | | | | |
| (2) | 1 | B | E,F | 0 | 0 | 0 | 0 | | | | |
| (2) | 1 | C | H,I | 0 | 0 | 0 | 0 | | | | |
| (1) | 1 | D | I,J | 1 | 0 | 0 | 0 | | | | |
| (2) | 1 | E | J,K | 0 | 0 | 0 | 0 | | | | |
| (2) | 1 | F | L | 0 | 0 | 0 | 0 | | | | |
| (1) | 1 | G | L,M | 1 | 0 | 1 | 0 | | 12:00 | | |
| (2) | 1 | H | X | 0 | 0 | 0 | 0 | | | | |
| (1) | 1 | I | X | 1 | 1 | 0 | 0 | | | | |
| (1) | 1 | J | X | 1 | 1 | 0 | 0 | | | | |
| (2) | 1 | K | Y | 0 | 0 | 0 | 0 | | | | |
| (3) | 1 | L | Y | 1 | 1 | 0 | 1 | G | 12:00 | | |
| (3) | 1 | M | Y | 1 | 1 | 0 | 1 | G | 12:00 | | |
| (4) | 2 | X | — | 0 | 1 | 0 | 0 | | | | |
| (3) | 2 | Y | — | 0 | 1 | 0 | 1 | G | 12:00 | | |

| ELE-MENT CLASS | ELEMENT IDENTI-FIER | REPERCUS-SION DES-TINATION IDENTIFIER | STATUS WORD | | | | REPERCUS-SION SOURCE IDENTIFIER | RECO-VERY TIME | EXTEN-SION CONDI-TION | NUMBER OF TIMES |
|---|---|---|---|---|---|---|---|---|---|---|
| | | | F | f | W | w | | | | |
| 1 | A | C,D | 0 | 0 | 0 | 0 | | | | |
| 1 | B | E,F | 0 | 0 | 0 | 0 | | | | |
| 1 | C | H,I | 0 | 0 | 0 | 0 | | | | |
| 1 | D | I,J | 0 | 0 | 0 | 0 | | | | |
| 1 | E | J,K | 0 | 0 | 0 | 0 | | | | |
| 1 | F | L | 0 | 0 | 0 | 0 | | | | |
| 1 | G | L,M | 0 | 0 | 0 | 0 | | | | |
| 1 | H | X | 0 | 0 | 0 | 0 | | | | |
| 1 | I | X | 0 | 0 | 0 | 0 | | | | |
| 1 | J | X | 0 | 0 | 0 | 0 | | | | |
| 1 | K | X | 0 | 0 | 0 | 0 | | | | |
| 1 | L | Y | 0 | 0 | 0 | 0 | | | | |
| 1 | M | Y | 0 | 0 | 0 | 0 | | | | |
| 2 | X | – | 0 | 0 | 0 | 0 | | | | |
| 2 | Y | – | 0 | 0 | 0 | 0 | | | | |

| ELEMENT IDENTIFIER | RECOVERY TIME |
|---|---|
| | 41 |
| ⋮ | ⋮ |

PRIOR ART
FIG. 11

| V FLAG<br>(=1/0<br>=VALID/INVALID) | DETECTION ALARM IDENTIFIER |
|---|---|
| | |
| | |
| ⋮ | ⋮ |

| WORK TIME SLOT | WORK ALARM IDENTIFIER |
|---|---|
| | |
| | |
| ⋮ | ⋮ |

RECORD POINTER OF FAULT ALARM DETERMINATION TABLE 74

SUPERVISORY CONTROL APPARATUS

This application is a continuation of international application number PCT JP00/04695, filed Jul. 13, 2000 (status, abandoned, pending, etc.).

BACKGROUND OF THE INVENTION

1. Field of the Invention

The present invention relates to a supervisory control apparatus which determines events that should be applied to the maintenance and operation of equipment or a system having a hierarchical structure among events that occur in the individual sections of the equipment or system.

2. Description of the Related Art

Nowadays, a variety of communication services are provided under the competition among a plurality of communication companies and the liberalization of the market and the number of terminals that use those communication services is increasing rapidly. Positive use of high-level information communication technologies enhances the added value of such terminals. Communication networks whose reliability and transmission quality are kept high and that can adapt to a variety of services in a flexible manner are demanded strongly.

FIG. 8 shows the configurations of a communication network and a supervisory control apparatus that is used for the maintenance and operation of the communication network.

As shown in FIG. 8, among the three communication ports of the supervisory control apparatus 50, a first communication port is connected to an alarm link 52 via an alarm collecting device 51. A second communication port of the supervisory control apparatus 50 is connected to data terminals 54-1 to 54-N via a LAN 53. A work slip reader 55 is connected to a third communication port of the supervisory control apparatus 50.

The supervisory control apparatus 50 is composed of a processor 58, a main storage 59, and a disc drive 60 that are connected to an internal bus 57 together with interfacing parts 56-1 to 56-3 that serve as the first to third communication ports, respectively.

Communication ports of respective node devices 62-A to 62-M that constitute the communication network 61 are connected to the alarm link 52.

As shown in FIG. 9, the communication network 61 is a set of the node devices 62-A to 62-M that are arranged in a hierarchical manner.

Identifiers "X" and "Y" shown in FIG. 9 are identifiers of two paths X and Y that are formed by cascade-connected node devices 62-H to 62-K and cascade-connected node devices 62-L to 62-M, respectively, as shown in FIG. 8.

In the above conventional example, as shown in FIG. 10, a system configuration database 71 in which arrays of identifier(s) ID-I of one or a plurality of components that correspond to an identifier ID-u of each component (one of the nodes 62-A to 62-M and the paths X and Y) and that are located immediately under the component indicated by the identifier ID-u in the hierarchical structure of FIG. 9 are registered is stored as a file in advance in a particular storage area of the disc drive 60 of the supervisory control apparatus 50.

As shown in FIG. 11, a primary alarm register 72 that is an array of records each being a set of the following two fields is provided in advance in the main storage 59:

A V flag field which indicates whether the value of a detection alarm identifier (described below) that is contained in the same record is valid.

A detection alarm identifier field which is to contain a detection alarm identifier that is a pair of an item indicating an event such as a certain alarm and an identifier ID of a component that has been communicated via the alarm link 52.

As shown in FIG. 12, a work alarm determination table 73 that is an array of records each being a set of the following two fields is also provided in advance in the main storage A work time slot field which indicates a time slot when an event such as an alarm may occur that is indicated by the value of a work alarm identifier field (described below) that is contained in the same record.

A work alarm identifier field which is to contain a work alarm identifier that is a pair of an item indicating the above event and an identifier ID of a component that has detected the event and about which the supervisory control apparatus 50 has been informed via the alarm link 52.

As shown in FIG. 13, a fault alarm determination table 74 that is an array of records described below is also provided in advance in the main storage 59:

A record which is to contain a repercussion alarm identifier that is a combination of an item and an identifier ID that were mentioned above. The repercussion alarm identifier indicates an event that corresponds to an individual value the above-mentioned detection alarm identifier can have and that may be recognized by a lower-rank component as an event indicated by that detection alarm identifier spreads.

As shown in FIG. 14, a secondary alarm register 75 that is a set of records each of which is to contain a detection alarm identifier that is a pair of an item indicating an event such as a failure or a fault that has truly occurred and an identifier ID indicating a component that has detected the event and about which the supervisory control apparatus 50 has been informed via the alarm link 52 is also provided in advance in the main storage 59.

When receiving information that has been read from a work slip via the work slip reader 55 and supplied via the interfacing part 56-3, the processor 58 acquires a work time slot, one of the nodes 62-A to 62-M and the paths X and Y on which the work should be done (hereinafter referred to as "work subject"), and an item indicating an event such as an alarm that may occur during the work all of which are included in the received information.

The processor 58 determines, under predetermined storage management, an empty record among the records of the work alarm determination table 73 and registers the above combination of the work time slot, an identifier of the work subject, and the item in the work time slot field, the work alarm identifier field of the empty record.

Regarding, as an identifier ID-u (described above), the identifier indicating the work subject as an individual component, the processor 58 acquires identifiers ID-I of all the sub-components that are registered in the system configuration database 71 as corresponding to the identifier ID-u and excludes redundant ones among the identifiers ID-I.

The processor 58 sequentially generates repercussion alarm identifiers that are combinations of the remaining identifiers ID-I and the item.

The processor 58 determines empty record among the records of the fault alarm determination table 74 under predetermined storage management, and stores the generated repercussion alarm identifiers in the empty record.

The processor 58 cooperates with the nodes 62-A to 62-M via the alarm collecting device 51 and the alarm link 52, and thereby acquires a message indicating an event such as an alarm of the nodes 62-A to 62-M upon its reception.

Further, the processor 58 stores alarm information that has been received as such a message in the detection alarm identifier field of an empty record of the primary alarm register 72 after converting it into information that complies with the format of the detection alarm identifier field, and sets the value of the V flag field of this record to "1."

Therefore, all messages that have been collected from the nodes 62-A to 62-M are first stored in the primary alarm register 72.

The processor 58 performs the following operations (1) and (2):

(1) Determines a particular record whose V flag field has a value "1" and that satisfies the following condition among the records of the primary alarm register 72:

The value of the detection alarm identifier field is the same as the value of the work alarm identifier field of a record whose value of work time slot field corresponds the present time among the records of the work alarm determination table 73.

(2) Updates the value of the V flag field of the thus-determined particular record to "0."

Therefore, the values of the V flag fields of only records, among the records of the primary alarm register 72, whose detection alarm identifiers have values not corresponding to any event such as a failure or fault that has occurred directly in association with predetermined work whose work slip was given in advance and that relates to maintenance or operation are kept at "1."

The processor 58 also performs the following operations (a) and (b):

(a) Acquires the repercussion alarm identifier that is registered in the record, among the records of the fault alarm determination table 74, corresponding to the detection alarm identifier field of the particular record the value of whose V flag field has been updated to "0" in the above-described manner.

(b) Updates the value of the V flag field of a record that satisfies both of the following conditions among the records of the primary alarm register 72, to "0":

The value of the V flag field is equal to "1."

The value of the detection alarm identifier is equal to the value of the repercussion alarm identifier thus acquired.

Therefore, among the records of the primary alarm register 72, the values of the V flag fields of only records whose detection alarm identifiers have values not corresponding to any event such as a failure or fault that has occurred directly in association with predetermined work whose work slip was given in advance and that relates to maintenance or operation or any event that has occurred as a result of spread of an event that occurred in association with work that was done on a higher-rank component (a node device or the like) are kept at "1."

Further, the processor 58 writes, to empty records of the secondary alarm register 75, the values of the detection alarm identifiers of only records whose V flag fields have a value "1" among the records of the primary alarm register 72, and performs predetermined operations that are suitable for events such as faults that are indicated by those detection alarm identifiers.

That is, an event such as a failure or fault that has been caused by and has occurred during work that has been done for maintenance or operation is excluded from subjects of a supervisory control with high accuracy.

Therefore, useless fault processing is prevented from being activated, a supervisory control is continued in a stable manner, and the running cost is reduced.

Incidentally, in the above conventional example, in general, the throughputs that are necessary for the generation of the work alarm determination table 73 and the fault alarm determination table 74, respectively, are higher when the amount of information registered in the system configuration database 71 is larger or the configuration of the communication network 61 is more complex.

However, nowadays, these throughputs are still increasing under circumstances that diversification of communication services provided by communication networks and quick adaptation (e.g., expansion or relocation of equipment) to a change in the forms of those communication services are strongly desired.

So that a failure, a fault, or the like that has occurred during work and a failure, a fault, or the like that has occurred secondarily as the former failure, fault, or the like spreads are determined and excluded properly from subjects of fault processing even under the above circumstances, the work alarm determination table 73 and the fault alarm determination table 74 should be subjected to complex, high-throughput logical operations and set operations.

However, the complication of those logical operations and set operations and the increase of the throughputs prevent change of the form and period of work that should be performed flexibly in maintenance or operation.

As a result, in the conventional example, the response speed of a supervisory control is not sufficiently high.

Nowadays, in a lot of communication systems, communication channels such as paths are logically formed on physical resources.

Therefore, a technique capable of determining, efficiently and with high accuracy, the source of a failure, a fault, or the like occurred during work even when the failure, fault, or the like has spread to such a path or the like is strongly required.

SUMMARY OF THE INVENTION

An object of the invention is to provide a supervisory control apparatus capable of increasing the efficiency and the flexibility of supervisory control without altering the hardware configuration.

Another object of the invention is to adapt flexibly and inexpensively to a variety of requirements relating to the configuration, state of operation, operation environment, and maintenance and operation of a system or equipment, which are subjects of supervisory control, and to highly keep the total performance, reliability, and quality of service.

Another object of the invention is to make the software simpler and smaller in scale and to enable more efficient supervisory control and power saving of work compared to those of the conventional art.

Another object of the invention is to prevent, efficiently and with high accuracy, spread of an event occurred in a certain component to a lower-rank component even when attributes of the event are not necessarily known or may vary in a variety of manners.

Still another object of the invention is to realize a quick and highly accurate identification of a component where an event occurred first, even when the event that occurred in a certain component has spread to its lower-rank component.

Another object of the invention is to realize a quick and highly accurate identification of a higher-rank component such as a transmission channel where a failure or fault occurred first, even for a component such as a communication channel that is not constituted as physical hardware capable of recognizing the failure or fault that has spread to the communication channel itself.

Still another object of the invention is to adapt to a variety of needs relating to the supervisory control on the system without complicating the configuration unduly or increasing the scale.

Another object of the invention is to quickly and properly inform the operating party or users of the system where a failure or fault has already occurred about an estimated time required for recovery from the failure or fault.

Still another object of the invention is to prevent a problem that the efficiency of a supervisory control decreases or the procedure of process becomes complex due to spread of an event occurred in a higher-rank component to its lower-rank component.

Another object of the invention is to automatically and continuously control spread of an event that occurred in a higher-rank component to a lower-rank component without complicating the structure of operation subjects, unduly increasing the amount of information of the operation subjects, or complicating the procedure of operations.

The above objects are achieved by providing a supervisory control apparatus in which immediately lower-rank components to which an event occurred in each of a plurality of components may spread are registered in advance. A particular status that an event occurred in a higher-rank component has spread to all lower-rank components is individually registered accordingly, based on an iterative algorithm. An event occurred in a component where such a particular status is registered is negated.

In this supervisory control apparatus, all lower-rank components to which an event that occurred in a higher-rank component may spread are identified one after another during the process of registering the particular status as described above, the components being in the system having a hierarchical structure.

The above objects are achieved by providing a supervisory control apparatus in which one or both of a failure that may occur in each component and a variation in a state of operation that may occur in each component according to what work may be done is/are the already described events.

In this supervisory control apparatus, for any component of the system as a subject of supervisory control, the spread of a failure or fault occurred in a higher-rank component is efficiently prevented with high accuracy.

Further, the above objects are achieved by providing a supervisory control apparatus in which an event occurred in each component is individually recognized as a combination of the event and attributes of the event.

In this supervisory control apparatus, an event occurred in a certain component of the system as a subject of supervisory control is identified reliably, even when attributes of the event at the time are not necessarily known or may vary in a variety of manners.

The above objects are achieved by providing a supervisory control apparatus in which a higher-rank component where an event that has spread to a lower-rank component actually occurred is recognized automatically and is registered correspondingly to the lower-rank component.

In this supervisory control apparatus, a higher-rank component where an event occurred can be quickly identified with high accuracy as long as a lower-rank component to which the event has spread can be recognized.

Further, the above objects are achieved by providing a supervisory control apparatus in which the predetermined system is constituted as a communication system, and part of the plurality of components are constituted as communication channels that are formed logically on physical transmission channels.

In this supervisory control apparatus, a higher-rank component where an event that has spread to a communication channel actually occurred can be quickly identified with high accuracy, even when the communication channel is intangible.

The above objects are achieved by providing a supervisory control apparatus in which unique information that corresponds to all combinations of events that may occur in each component and attributes of the events is registered in advance, and unique information corresponding to a combination of an event that has spread physically from a higher-rank component and attributes of the event is acquired when necessary.

In this supervisory control apparatus, the unique information described above is defined uniquely according to an event that may occur in the plurality of components and attributes of the event, and can be quickly obtained with high accuracy as long as the event and the attributes are identified.

Further, the above objects are achieved by providing a supervisory control apparatus in which the unique information described above corresponds to a combination of each failure that may occur as an event in each component and attributes of the failure, and is provided as a recovery time from the failure.

In this supervisory control apparatus, a recovery time can be obtained when a failure or fault occurred in a higher-rank component spreads physically. The recovery time can thus be referred to efficiently, without performing complex process during a supervisory control.

The above objects are achieved by providing a supervisory control apparatus in which conditions for permitting an event to spread to a lower-rank component are registered in advance for respective combinations of the plurality of components and events that may occur individually in the plurality of components, and any of the events is negated only when such a condition is satisfied.

In this supervisory control apparatus, an event that occurred in any component is negated unless the above-mentioned condition is satisfied, and hence is prevented from spreading to its lower-rank component.

Further, the above objects are achieved by providing a supervisory control apparatus in which conditions for permitting an event to spread to a lower-rank component are registered in advance for respective combinations of the plurality of components and events that may occur individually in the plurality of components, and operation of a lower-rank component to which any event spreads is permitted only when such a condition is satisfied.

In this supervisory control apparatus, an event that occurred in any component is negated unless the above-mentioned condition is satisfied, and hence is prevented from spreading to its lower-rank component.

The above objects are achieved by providing a supervisory control apparatus judging whether an event that spread to a component in which any condition satisfied in advance has disappeared or not, and recognizing a condition for which a result of the judgment is false as still being satisfied for a predetermined time.

In this supervisory control apparatus, even when a certain condition that has been satisfied in advance comes not to be satisfied, the event mentioned above is negated as an event that has not occurred during the predetermined time.

Further, the above objects are achieved by providing a supervisory control apparatus in which the process regarding a condition satisfied in advance as still being satisfied during the predetermined time is repeated the predetermined number of times.

In this supervisory control apparatus, even when a certain condition that has been satisfied in advance comes not to be satisfied, an event that forms a combination with the condition is negated as an event that has not occurred since the condition comes not to be satisfied to a time equal to a product obtained by multiplying the above predetermined time by the predetermined number of times.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIGS. 3A and 3B and FIG. 4 illustrate the operations of the first to fourth embodiments of the invention;

FIG. 5 shows the structure of a status management table;

FIG. 6 shows the structure of a recovery time table;

FIG. 11 shows the structure of a primary alarm register;

FIG. 12 shows the structure of a work alarm determination table;

DESCRIPTION OF THE PREFERRED EMBODIMENTS

Figure 1:
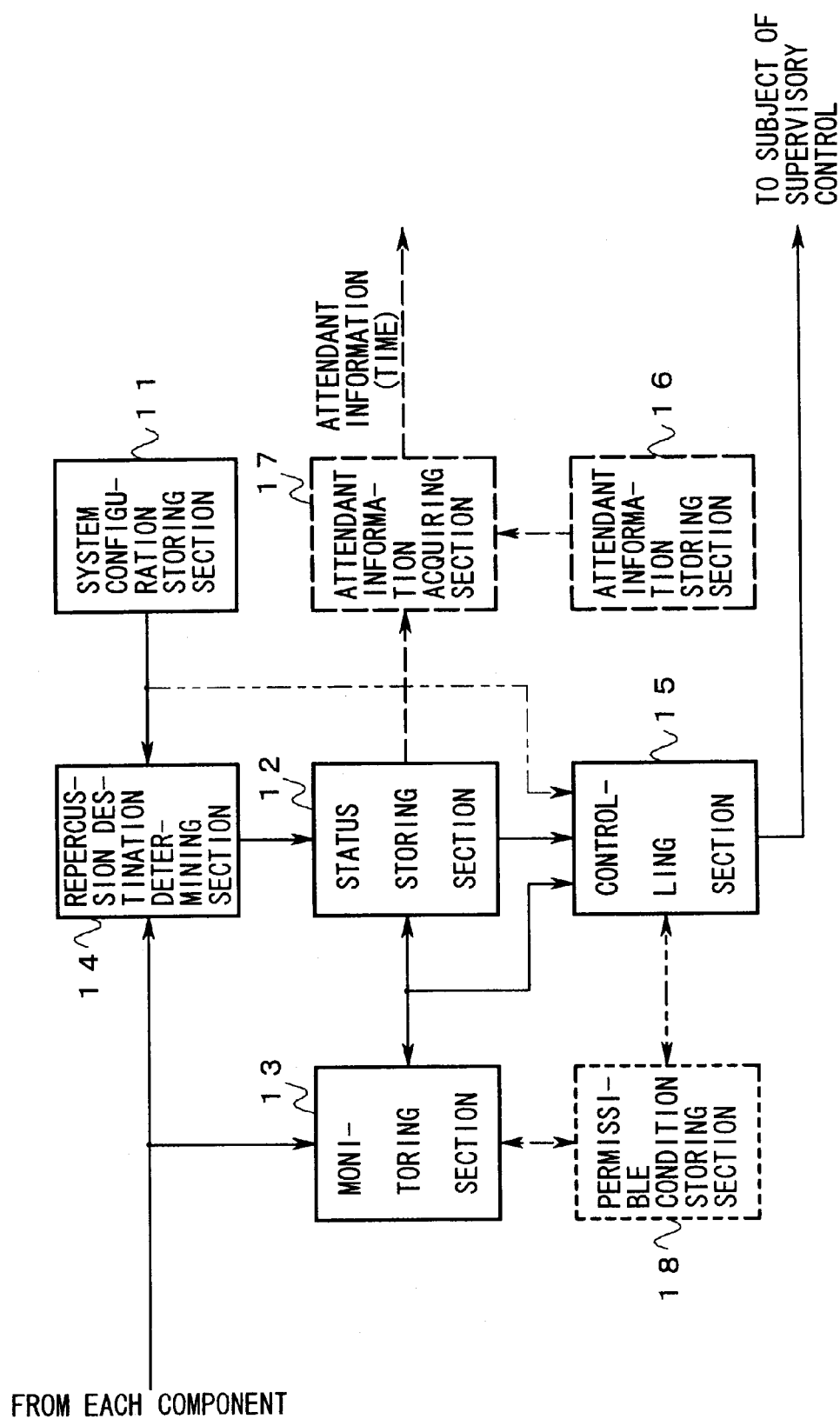
FIG. 1 is a block diagram showing the principle of the supervisory control apparatus according to the invention.

First, the principle of a supervisory control apparatus according to the invention will be described with reference to FIG. 1. FIG. 1 is a block diagram showing the principle of the supervisory control apparatus according to the invention.

The supervisory control apparatus shown in FIG. 1 is composed of a system configuration storing section 11, a status storing section 12, a monitoring section 13, a repercussion destination determining section 14, a controlling section 15, an attendant information storing section 16, an attendant information acquiring section 17, and a permissible condition storing section 18.

The principle of a first supervisory control apparatus according to the invention is as follows.

The system configuration storing section 11 has registered in advance a component immediately lower to each of a plurality of components that are arranged hierarchically and constitute a predetermined system, the immediately lower-rank component being the component to which an event that occurred individually may spread. The status storing section 12 has storage areas for each of the plurality of components, the storage areas being registered a first status that the event has occurred individually, a second status that the event occurred in an immediately higher-rank component has spread, and a third status that does not fall under the first or second status. The monitoring section 13 judges whether the event has occurred in the plurality of components, and respectively registers the first status and the third status in storage areas corresponding to components where the event has actually occurred or then disappeared among the storage areas of the status storing section 12. The repercussion destination determining section 14 registers the second status in storage areas corresponding to all immediately lower-rank components among the storage areas of the status storing section 12, the immediately lower-rank components being registered hierarchically in the system configuration storing section 11 and being registered correspondingly to the components where the event has actually occurred. The controlling section 15 recognizes results of monitoring on the plurality of components based on combinations of statuses registered in the status storing section 12, and controls the plurality of components based on the combinations. The monitoring section 13 negates an event that occurred in a component corresponding to the storage area of the status storing section 12 which is registered the second status, from the plurality of components.

In this supervisory control apparatus, all lower-rank components to which an event that occurred in a higher-rank component may spread are identified one after another during the process in which the repercussion destination determining section 14 registers the second status in storage areas of the status storing section 12 as described above, the components being in the system having a hierarchical structure Therefore, the invention allows the software to be simpler and smaller in scale, the supervisory control on the system to be more efficient, and the work to be more power-saving than those of the conventional art in which the lower-rank components should be defined in advance as a set of pieces of information corresponding to all events that may occur in individual components.

The principle of a second supervisory control apparatus according to the invention is as follows.

The above event is one or both of a failure that may occur individually in the plurality of components and a variation in a state of operation that may occur in the plurality of components according to what work may be done.

In this supervisory control apparatus, for any component of the system as a subject of supervisory control, the spread of a failure or fault occurred in a higher-rank component is efficiently prevented with high accuracy.

The principle of a third supervisory control apparatus according to the invention is as follows.

The system configuration storing section 11 and the status storing section 12 have storage areas corresponding to attributes of all events that may occur in the plurality of components. The monitoring section 13, the repercussion destination determining section 14, and the controlling section 15 individually recognize each actual event as a combination of the event and attributes of the event.

In this supervisory control apparatus, spread of an event occurred in a certain component of the system as a subject of supervisory control is efficiently prevented with high accuracy, even when attributes of the event at the time are not necessarily known or may vary in a variety of manners.

The principle of a fourth supervisory control apparatus according to the invention is as follows.

The status storing section 12 has a source storage area that is paired with each storage area in which the second status is to be registered, the source storage area storing an identifier of a higher-rank component where a spread event occurred as a cause of registration of the second status. The repercussion destination determining section 14 registers an identifier of a higher-rank component where the event has actually occurred in a source storage area that is paired with a storage area in which the second status is to be registered among the storage areas of the status storing section 12.

In this supervisory control apparatus, even when an event that occurred in a certain component of the system as a subject of supervisory control has spread to its lower-rank component, the component where the event occurred first can be quickly identified with high accuracy as long as the lower-rank component can be recognized.

The principle of a fifth supervisory control apparatus according to the invention is as follows.

The predetermined system is constituted as a communication system, and part of the plurality of components are communication channels formed logically on physical transmission channels.

In this supervisory control apparatus, a quick and highly accurate identification of a higher-rank component such as a transmission channel where a failure or fault occurred first can be realized, even for a component such as the above communication channel that is not constituted as physical hardware capable of recognizing the failure or fault that has spread to the communication channel itself.

The principle of a sixth supervisory control apparatus according to the invention is as follows.

The attendant information storing section 16 is registered information in advance, the information corresponding to all combinations of events that may occur in the plurality of components and attributes of the events, and being unique to the combinations. The attendant information acquiring section 17 acquires information registered in the attendant information storing section 16 corresponding to a combination of an event and attributes of the event, the event having spread to a component of the status storing section 12 in which the second status is registered.

In this supervisory control apparatus, the unique information described above is defined uniquely according to an event that may occur in the plurality of components and attributes of the event, and can be quickly obtained with high accuracy as long as the event and the attributes are identified.

Accordingly, it is possible to adapt to a variety of needs relating to the supervisory control on the system without complicating the configuration unduly or increasing the scale.

The principle of a seventh supervisory control apparatus according to the invention is as follows.

The attendant information storing section 16 has time required for recovering from a failure registered in advance, the time individually indicated for each of the plurality of components, and the failure being any of all combinations of failures that may occur as events and attributes of the failures. The attendant information acquiring section 17 acquires a recovery time registered in the attendant information storing section 16 corresponding to a combination of an event and attributes of the event, the event having spread to a component of the status storing section 12 in which the second status is registered.

In this supervisory control apparatus, a recovery time from a failure or fault that occurred in a higher-rank component and spread to its lower-rank component is registered in advance as the unique information in the sixth supervisory control apparatus described above, and is acquired when necessary.

Thus, it is possible to quickly and properly inform the operating party or users of the system where a failure or fault has occurred about an estimated time required for recovery from the failure or fault.

The principle of an eighth supervisory control apparatus according to the invention is as follows.

Conditions for permitting an event to spread to a lower-rank component are registered in advance in the permissible condition storing section 18 for respective combinations of the plurality of components and events that may occur individually in the plurality of components. The monitoring section 13 judges whether a condition registered in the permissible condition storing section 18 is satisfied in each combination of an event to be negated and a component where the event has occurred, the monitoring section 13 negating the event only when a result of the judgment is false.

In this supervisory control apparatus, an event that occurred in any component is negated unless the above-mentioned condition is satisfied, and hence is prevented from spreading to its lower-rank component.

This prevents a problem that the efficiency of a supervisory control decreases and the procedure of process becomes complex due to spread of an event occurred in a higher-rank component to its lower-rank component as long as the conditions are defined so as to meet the needs of the supervisory control.

The principle of a ninth supervisory control apparatus according to the invention is as follows.

Conditions for permitting an event to spread to a lower-rank component are registered in advance in the permissible condition storing section 18 for respective combinations of the plurality of components and events that may occur individually in the plurality of components. The controlling section 15 permits, only for a combination satisfying a condition registered in the permissible condition storing section 18 among the combinations, operation of an immediately lower-rank component to which the event constituting the combination is spread among the components registered in the system configuration storing section 11.

In this supervisory control apparatus, an event that occurred in any component is negated unless the above-mentioned condition is satisfied, and hence is prevented from spreading to its lower-rank component.

This prevents a problem that the efficiency of a supervisory control decreases and the procedure of process becomes complex due to spread of an event occurred in a higher-rank component to its lower-rank component as long as the conditions are defined so as to meet the needs of the supervisory control.

The principle of a tenth supervisory control apparatus according to the invention is as follows.

The monitoring section 13 judges whether events constituting combinations corresponding to respective conditions that have been satisfied in advance among the conditions registered in the permissible condition storing section 18 have disappeared or not, and regards conditions for which a result of the judgment is false among the conditions that have been satisfied in advance as still being satisfied for a predetermined time.

In this supervisory control apparatus, even when a certain condition that has been satisfied in advance comes not to be satisfied, an event that forms a combination with the condition is negated as an event that has not occurred during the predetermined time.

Therefore, spread to a lower-rank component is prevented automatically and continuously, even when no new information is registered in the system configuration storing section 11 or the status storing section 12.

The principle of an eleventh supervisory control apparatus according to the invention is as follows.

The monitoring section 13 regards the conditions for which the result of the judgment is false as still being satisfied for the predetermined time and only for a predetermined number of times.

In this supervisory control apparatus, even when a certain condition that has been satisfied in advance comes not to be satisfied, an event that forms a combination with the condition is negated as an event that has not occurred since the condition comes not to be satisfied to a time equal to a product obtained by multiplying the above predetermined time by the predetermined number of times.

Therefore, spread to a lower-rank component is prevented flexibly and automatically even when no new information is registered in the system configuration storing section 11 or the status storing section 12 as long as the predetermined number of times is set in advance to a value suitable for the needs of a supervisory control.

Embodiments of the invention will be hereinafter described in detail with reference to the drawings.

Figure 2:
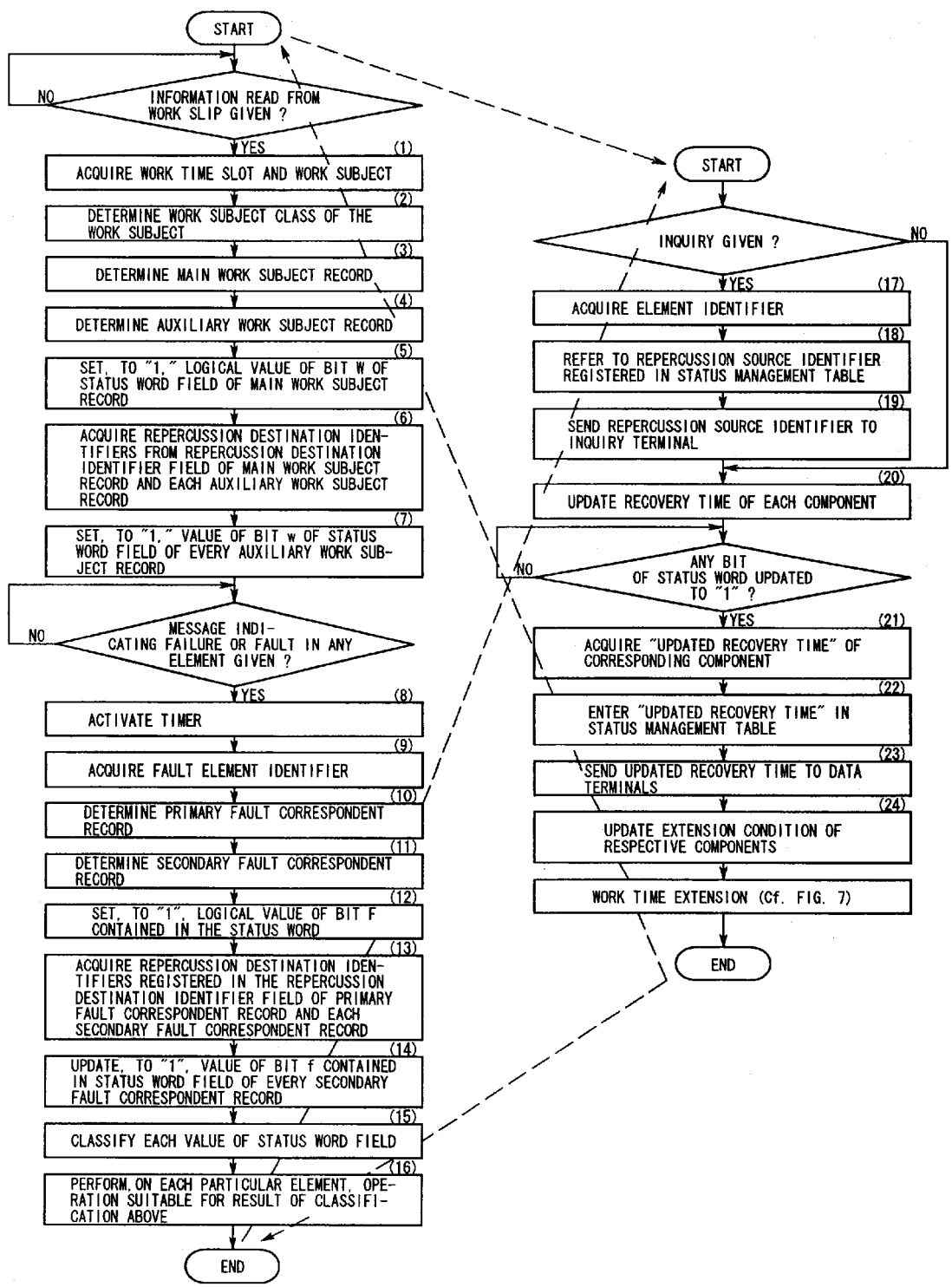
FIG. 2 is an operation flowchart of first to third embodiments of the invention.

FIG. 2 is an operation flowchart of first to third embodiments of the invention. FIGS. 3A and 3B and FIG. 4 illustrate the operations of the first to fourth embodiments.

The operation of the first embodiment of the invention will be described below with reference to FIGS. 2–4, 8–11, and 14.

This embodiment is characterized in the structures of the following pieces of information that are stored in the main storage 59 and the procedures of processing performed by the processor 58 by referring to those information.

Instead of the work alarm determination table 73 and the fault alarm determination table 74, a status management table 31 that is a set of records each consisting of the following fields (see FIG. 5) is provided in a particular storage area of the main storage 59:

An element identifier field in which unique each of identifiers A-M, X, and Y (hereinafter referred to as "element identifiers") that are given to the node devices 62-A to 62-M and the paths X and Y which are the components (resources) of the communication network 61 is contained in advance.

An element class field in which an element class of the component (hereinafter referred to as "corresponding element") that is indicated by the element identifier contained in the element identifier field is contained in advance. The element class is set to "1" for physically existent resources such as the node devices 62-A to 62-M, and to "2" for resources that are logically formed such as the paths X and Y.

A repercussion destination identifier field in which an array of element identifiers (hereinafter referred to as "repercussion destination identifiers") that are given individually to all sub-components that are disposed immediately under the corresponding element in the hierarchical communication network 61 (see FIG. 9) is contained in advance.

A status word field in which a status word that is defined as a bit string of four bits F, f, W and w that are given a logical value "1" only if the corresponding element is categorized as the following components i) to iv), respectively, is contained:

i) A highest-rank component where a certain failure or fault has occurred or that can detect a certain failure or fault that has occurred.

ii) A component having an immediately higher-rank component where a failure or fault has occurred or to which a failure or fault that has been detected by the immediately higher-rank component can spread.

iii) A component on which work that may be a factor of causing a failure or fault is done directly during maintenance or operation.

iv) A component to which a failure or fault that has occurred during work that has been done on an immediately higher-rank component may spread.

Figure 9:
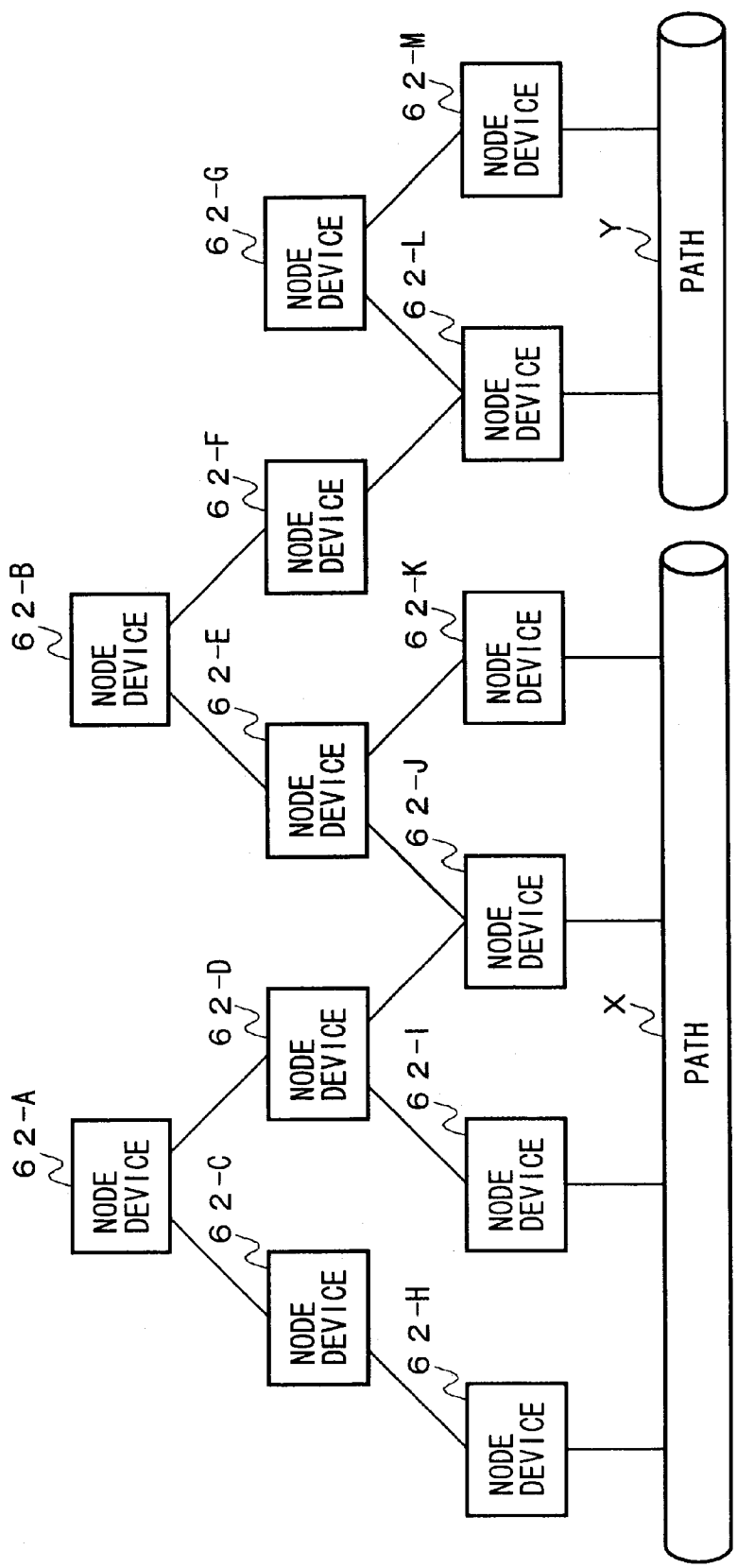
FIG. 9 shows the hierarchical structure of the communication network.
Figure 10:
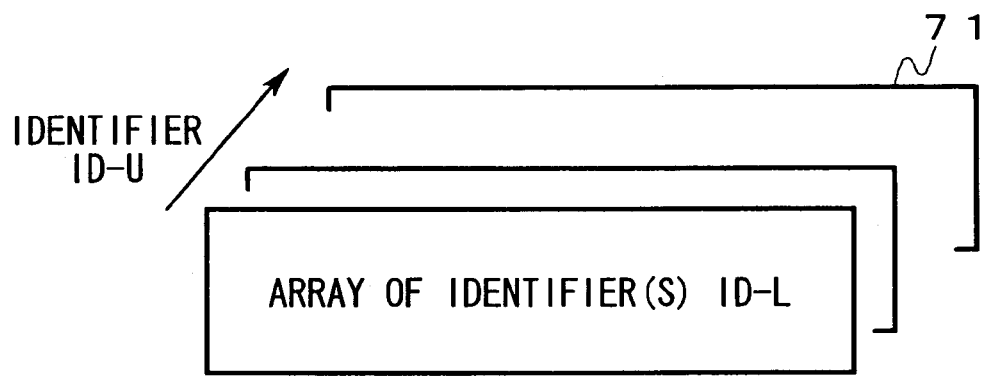
FIG. 10 shows the structure of a system configuration database.
Figure 13:
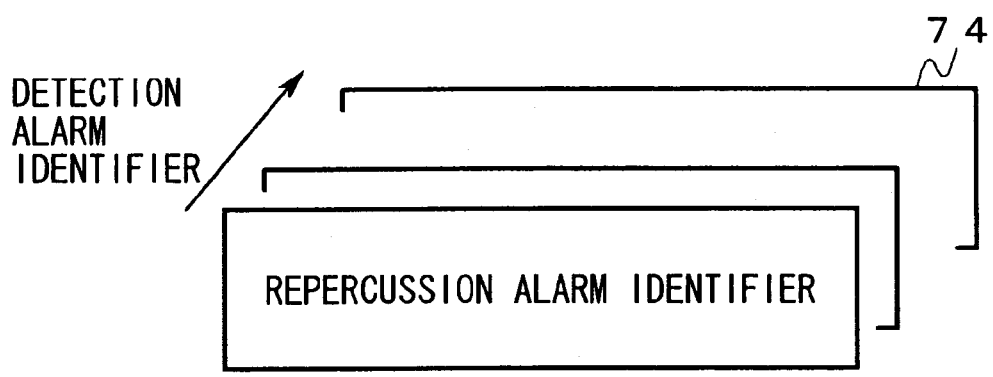
FIG. 13 shows the structure of a fault alarm determination table.
Figure 14:
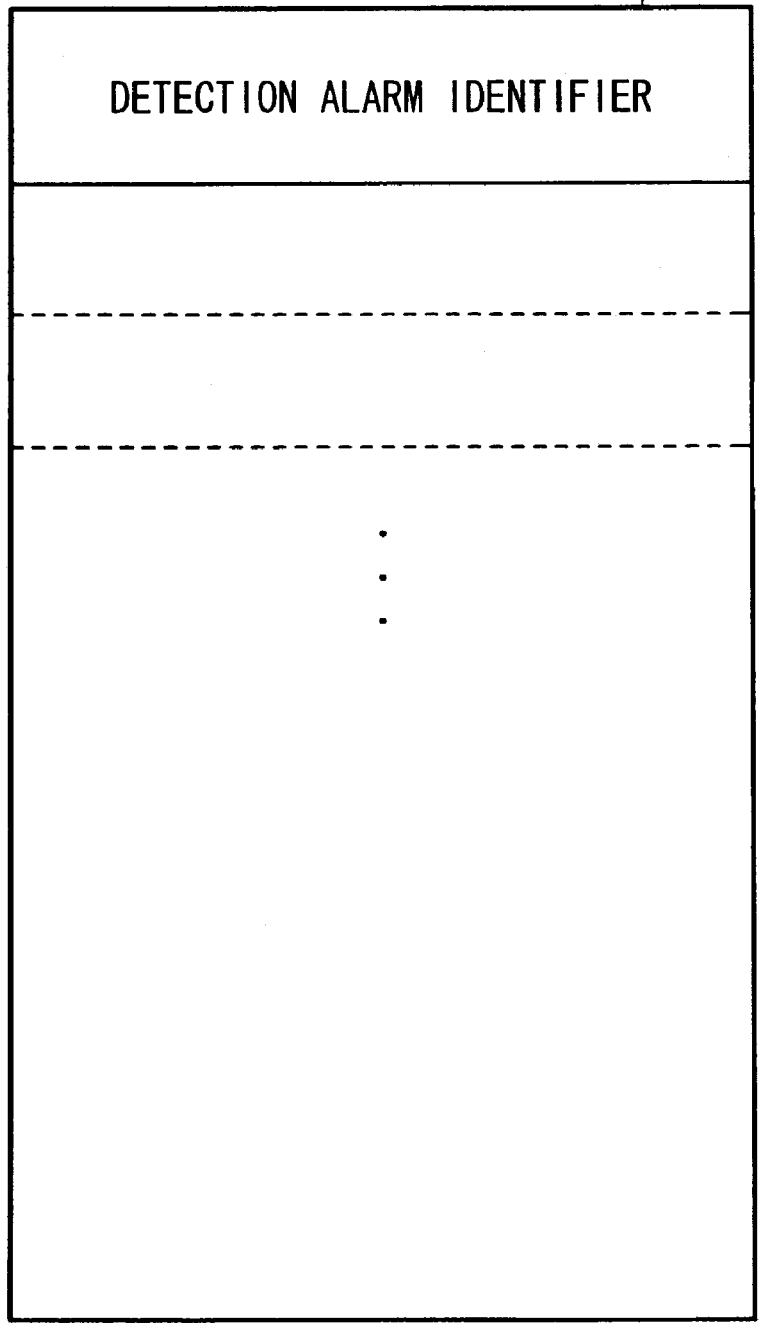
FIG. 14 shows the structure of a secondary alarm register.

The values of the element class fields, the element identifier fields, and the repercussion destination identifier fields among the fields of the status management table 31 are set to values that are suitable for the hierarchical structure of the communication network 61 shown in FIG. 9 which is registered as the system configuration database 71, and are incorporated, as constants, into software to be executed by the processor 58 when it is generated.

In a supervisory control that is performed according to this software, the processor 58 updates, when necessary, the values of the element class fields, the element identifier fields, and the repercussion destination identifier fields to values suitable for the system configuration of the communication network 61 as a subject of the supervisory control.

At a start, the processor 58 initializes, to "0000," the values of the status words that are contained in all the records of the status management table 31.

Incidentally, in the supervisory control, when receiving information on a work slip that has been read by the work slip reader 55 and supplied via the interfacing part 56-3, the processor 58 acquires a work time slot and a work subject (one of the nodes 62-A to 62-M and the paths X and Y) that are included in the received information (indicated by symbol (1) in FIG. 2).

For the sake of simplicity, it is assumed that the work subject is the node device 62-G.

Then, the processor 58 performs the following operations (I) to (VI):

(I) Judges whether the work subject is one of the node devices 62-A to 62-M, and determines a work subject class as a logical value of a variable that is equal to "1" if the judgment result is "true" and "0" if the judgment result is "false" (indicated by symbol (2) in FIG. 2).

(II) Determines a record (indicated by symbol (1) in FIG. 3A; hereinafter referred to as "main work subject record") that satisfies both of the following conditions among the records of the status management table 31 (indicated by symbol (3) in FIG. 2):

The value of the element class field is equal to the value of the work subject class.

The value of the element identifier field corresponds to the node or path as the work subject.

(III) Sequentially determines all records (indicated by symbol (2) in FIG. 3A; hereinafter referred to as "auxiliary work subject records") that satisfy the following condition among the records of the status management table 31 (indicated by symbol (4) in FIG. 2):
The value of the element identifier field is equal to any of the element identifiers that are contained in the repercussion destination field of the main work subject record.

(IV) Sets, to "1," the logical value of bit W of the status word field of the main work subject record (indicated by symbol (5) in FIG. 2).

(V) Acquires all repercussion destination identifiers (L, M, and Y) that are registered in the repercussion destination identifier fields of the main work subject record and the auxiliary work subject records (indicated by symbol (6) in FIG. 2).

(VI) Updates, to "1," the value of bit w of the status word field of every auxiliary work subject record (indicated by symbol (7) in FIG. 2).

Cooperating with the nodes 62-A to 62-M via the alarm collecting device 51 and the alarm link 52, the processor 58 acquires a message indicating a failure or fault in the nodes 62-A to 62-M and the paths X and Y every time the processor 58 receives such a message.

Then, the processor 58 performs, when appropriate, the following operations (A)–(G) in response to such a message:

(A) Activates a timer in which a predetermined interval is set in advance (indicated by symbol (8) in FIG. 2). For the sake of simplicity, it is assumed that the interval has a value that is greater than or equal to a maximum time that is taken by a failure or fault as mentioned above to spread to a lower-rank component transiently (e.g., 30 seconds).

(B) Acquires an element identifier (hereinafter referred to as "fault element identifier") that is included in the message and indicates a component (one of the node devices 62-A to 62-M and not one of the paths X and Y as a transmitting end of the message (indicated by symbol (9) in FIG. 2).

(C) Determines a record (indicated by symbol (1) in FIG. 3B; hereinafter referred to as "primary fault correspondent record") whose element identifier field has a value that is equal to the fault element identifier among the records of the status management table 31 (indicated by symbol (10) in FIG. 2).

(D) Determines records (indicated by symbol (2) in FIG. 3B; hereinafter referred to as "secondary fault correspondent records") that satisfy the following condition among the records of the status management table 31 (indicated by symbol (11) in FIG. 2):
The value of the element identifier field is equal to one of the element identifiers that are contained in the repercussion destination identifier field of the primary fault correspondent record.

(E) Updates the logical value of bit F of the status word field of the primary fault correspondent record to "1" (indicated by symbol (12) in FIG. 2).

(F) Acquires all repercussion destination identifiers (L, M, and Y) that are registered in the repercussion destination identifier fields of the primary fault corespondent record and the secondary fault correspondent records (indicated by symbol (13) in FIG. 2).

(G) Updates the value of bit f of the status word field of every secondary fault correspondent record to "1" (indicated by symbol (14) in FIG. 2).

After completion of the clocking by the timer that was activated as described above, the processor 58 classifies the records of the status management table 31 into the following records based on the logical values of four bits that are contained in the status word field (indicated by symbol (15) in FIG. 2):

Record F in which the logical values of only both of bits F and f or the logical value of only bit F is equal to "1" (indicated by symbol (1) in FIG. 4).

Record N in which the logical values of both of bits F and f are equal to "0" (indicated by symbol (2) in FIG. 4).

Record W in which the logical values of both of bits F and f or the logical value of bit f is equal to "1" and the logical values of both or one of bits W and w are equal to "1" (indicated by symbol (3) in FIG. 4).

Record f in which the logical value of only bit f is equal to "1" and the logical values of both of bits W and w are equal to "0" (indicated by symbol (4) in FIG. 4).

Then, the processor 58 performs the following operations on components (hereinafter referred to as "particular elements") that are indicated by the values of the element class fields and the element identifier fields of the records F, N, W, and f (indicated by symbol (16) in FIG. 2):

Recognizes the particular elements corresponding to records F as components where a failure or fault has occurred actually without being influenced by any work.

Recognizes the particular elements corresponding to records N as components on which no work has been done and where no failure or fault has occurred.

Recognizes the particular elements corresponding to records W as components where a certain failure has occurred due to work and to which a similar failure or fault that occurred in a higher-rank component has spread, and excludes such failures or faults from subjects of fault processing.

Recognizes the particular elements corresponding to records f as components where a failure or fault that occurred in a higher-rank component due to an improper value of the timer or suspension of work has been recognized transiently, and employs those particular components as subjects of fault processing or excludes those components from the subjects of the fault processing under predetermined judgment processing.

Among the four bits F, f, W, and w of the status word field, bits W and w are set under processing that is performed by the processor 58 according to the above-described iterative algorithm only during a period when work is done and bits F and f are updated as appropriate at a time point when a failure or fault has occurred.

However, only element identifiers indicating immediately lower-rank components are to be contained in the repercussion destination identifier fields. Therefore, the amount of information to be stored in the status management table 31 is much smaller than the amount of information to be stored in the work alarm determination table 73 and the fault alarm determination table 74 in the conventional example.

As described above, according to this embodiment, the status management table 31 which is simpler in structure and smaller in the amount of information than the work alarm determination table 73 and the fault alarm determination table 74 is referred to by the processor 58 according to the above-described procedure, which enable flexible and quick adaptation to a variety of configuration of the communication network 61 and realize a supervisory control on the communication network 61 efficiently and with high accuracy.

The second embodiment of the invention will be hereinafter described.

This embodiment is characterized in that a status management table 31A is provided in place of the status management table 31 and that the processor 58 performs the following operations.

The status management table 31A is different in structure from the status management table 31 in that a repercussion source identifier field to contain one of the following element identifiers is added to each record:

An element identifier indicating a component that is located immediately higher rank than the component indicated by the value of the element identifier field.

An element identifier indicating a component where a failure or fault that causes updating, to "1," of the logical value of bit f of the status word field may occur among components higher than the component indicated by the value of the element identifier field.

The operation of the second embodiment of the invention will be described below with reference to FIGS. 2, 5, 8, and 9.

For the sake of simplicity, it is assumed that the values of the repercussion source identifier fields of the status management table 31A is initialized at a start and updated when necessary in accordance with the system configuration that is recognized during a supervisory control like the values of the element class fields, the element identifier fields, and the repercussion destination identifier fields are done.

When recognizing a message that is an inquiry relating to a component where a failure or fault has occurred or a component lower than the former component from one of the data terminals 54-1 to 54-N (hereinafter referred to as "inquiry terminal") via the LAN 53 and the interfacing part 56-2, the processor 58 acquires an element identifier that is included in the message (indicated by symbol (17) in FIG. 2).

Then, the processor 58 determines a record whose element identifier field has the same value as the acquired element identifier, and refers to the value of the repercussion source identifier field of the record thus determined among the records of the status management table 31A (indicated by symbol (18) in FIG. 2).

The processor 58 sends the value of the repercussion source identifier field to the inquiry terminal via the interfacing part 56-2 (indicated by symbol (19) in FIG. 2).

The inquiry terminal converts the received repercussion source identifier into information indicating a corresponding component, and communicates the information to the operator via a peripheral device that provides a predetermined man-machine interface.

That is, a component where a certain failure or fault has occurred among the components (resources) of the communication network 61 can be identified quickly without performing complex processing that requires a high throughput even if the component is formed logically like the paths X and Y on physical resources as long as the configuration of the communication network 61 is given as a known system configuration.

Therefore, according to this embodiment, the flexible adaptation to the configuration of the communication network 61 is maintained and the subscribers and the operating party of the communication network 61 are informed, efficiently with high accuracy, of a device where a failure or fault has occurred actually.

In this embodiment, the values of the repercussion source identifier fields are directly incorporated, as constants, into software that is to be executed by the processor 58 and are updated when necessary in accordance with a system configuration. However, for example, the values of the repercussion source identifier fields may be set or updated as appropriate based on office data that are defined as the system configuration database 71 or the like when work is started based on the contents of a work slip.

The third embodiment of the invention will be hereinafter described.

This embodiment is characterized in that a recovery time table 41 (described below) is provided in a predetermined storage area of the main storage 59 and that a status management table 31B is provided in place of the status management table 31A.

Figure 6:
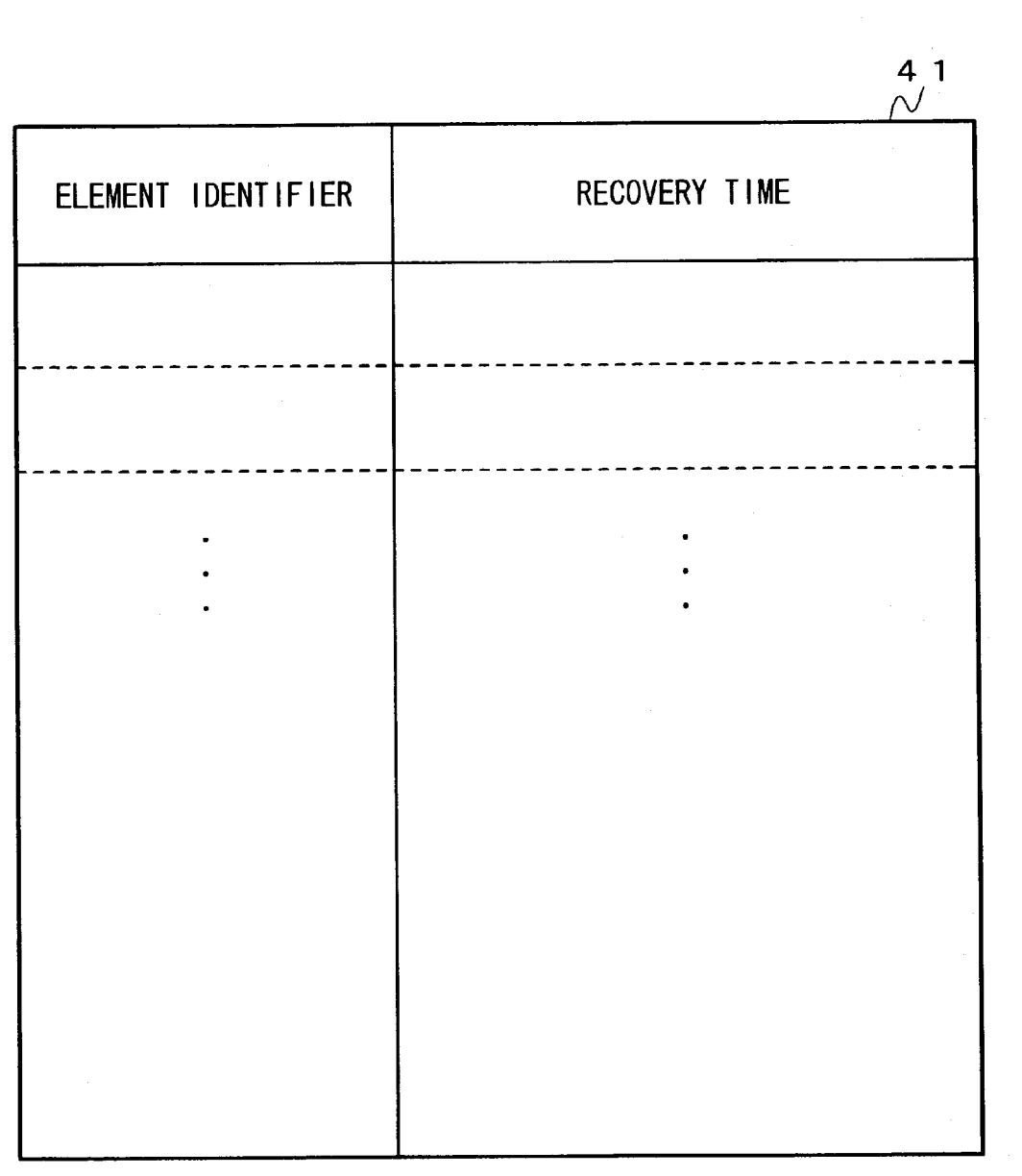

As shown in FIG. 6, the recovery time table 41 is a set of records that correspond to the respective components (resources) of the communication network 61 and each of which consists of an element identifier field to contain a unique element identifier of the corresponding component and a recovery time field to contain a standard time that will be taken for the corresponding component to recover from a failure or fault that will occur there.

The status management table 31B is different in structure from the status management table 31A in that each record is provided with the recovery time field in place of or together with the repercussion source identifier field.

The operation of the third embodiment of the invention will be described below with reference to FIGS. 3–5, 8–11, and 14.

For the sake of simplicity, it is assumed that the values of the recovery time table 41 is initialized at a start and updated when necessary in accordance with the system configuration that is recognized during a supervisory control.

During processing of a supervisory control, the processor 58 calculates, when necessary, an estimate of time (hereinafter referred to as "recovery time") that will be taken for each component (resource) to recover from a failure or fault that will occur there based on information that is collected from the component.

Then, the processor 58 determines a record, among the records of the recovery time table 41, in which the element identifier of a component (resource) whose recovery time has been calculated in the above manner is contained in the element identifier field, and enters the recovery time in the recovery time field of the record thus determined (indicated by symbol (20) in FIG. 2).

The processor 58 refers to the status management table 31B in the same manner as refers to the status management tables 31 and 31A in the first and second embodiments, respectively.

In referring to the status management table 31B, the processor 58 performs the following operations every time it updates the logical value of one of the four bits F, f, W and w of the status word field from "0" to "1":

Acquires the value of the element identifier field of the record to which the status word field belongs.

Determines a record in which the acquired value is contained in the element identifier field among the records of the recovery time table 41.

Acquires the value (hereinafter referred to as "updated recovery time") of the recovery time field of the record thus determined (indicated by symbol (21) in FIG. 2).

Enters the updated recovery time in the recovery time field of the same record of the status management table 31B as the above-mentioned status word field belongs to (indicated by symbol (22) in FIG. 2).

The processor 58 sends the updated recovery time that has been entered in the recovery time field of the status management table 31B in this manner to one of the data terminals 54-1 to 54-N via the interfacing part 56-2 and the LAN 53 (indicated by symbol (23) in FIG. 2).

That is, for a failure or fault that has occurred in a component (resource) of the communication network 61, time necessary for recovery as well as its source is communicated to a subscriber quickly with high accuracy without performing complex processing or processing having a high throughput irrespective of whether it has been caused by work relating to maintenance or operation.

Therefore, this embodiment increases the reliability of a supervisory control on the communication network 61 and the efficiency of work, and simplifies the work.

In the second and third embodiments, each record of the status management table 31A or 31B includes the repercussion source identifier field to contain a repercussion source identifier and/or the recovery time field to contain a recovery time.

However, the repercussion source identifier and the recovery time may be contained, in any form, in a field other than the repercussion source identifier field and the recovery time field as long as they are obtained directly during a supervisory control on simple processing.

In this embodiment, no operation subject and operation procedure for calculating a recovery time are described.

However, a recovery time can be calculated by using a variety of techniques that are suitable for the configuration of the communication network 61 and the system (including the personnel and their arrangement) for the maintenance and operation of the communication system 61.

For example, recovery times may be updated as appropriate in accordance with the personnel and their arrangement for the maintenance and operation, the stock of parts to be used, and other factors.

In this embodiment, operators who manipulate the data terminals 54-1 to 54-N notify subscribers or the like vocally about recovery times. However, recovery times may be used for the maintenance and operation of the communication network 61 in a manner that they are provided, when necessary, to not only the subscribers but also one or both of a communication company as the operating party of the communication network 61 and a company under contract to maintain and operate the communication network 61.

The fourth embodiment of the invention will be hereinafter described.

This embodiment is characterized in that a status management table 31C is provided in place of the status management table 31A.

The status management table 31C is different in structure from the status management table 31A in that each record is provided, in place of or together with the repercussion source identifier field, with an extension condition field to contain a condition (hereinafter referred to as "extension condition") for permitting extension of work of a component (resource) indicated by the value of the element identifier field.

Figure 7:
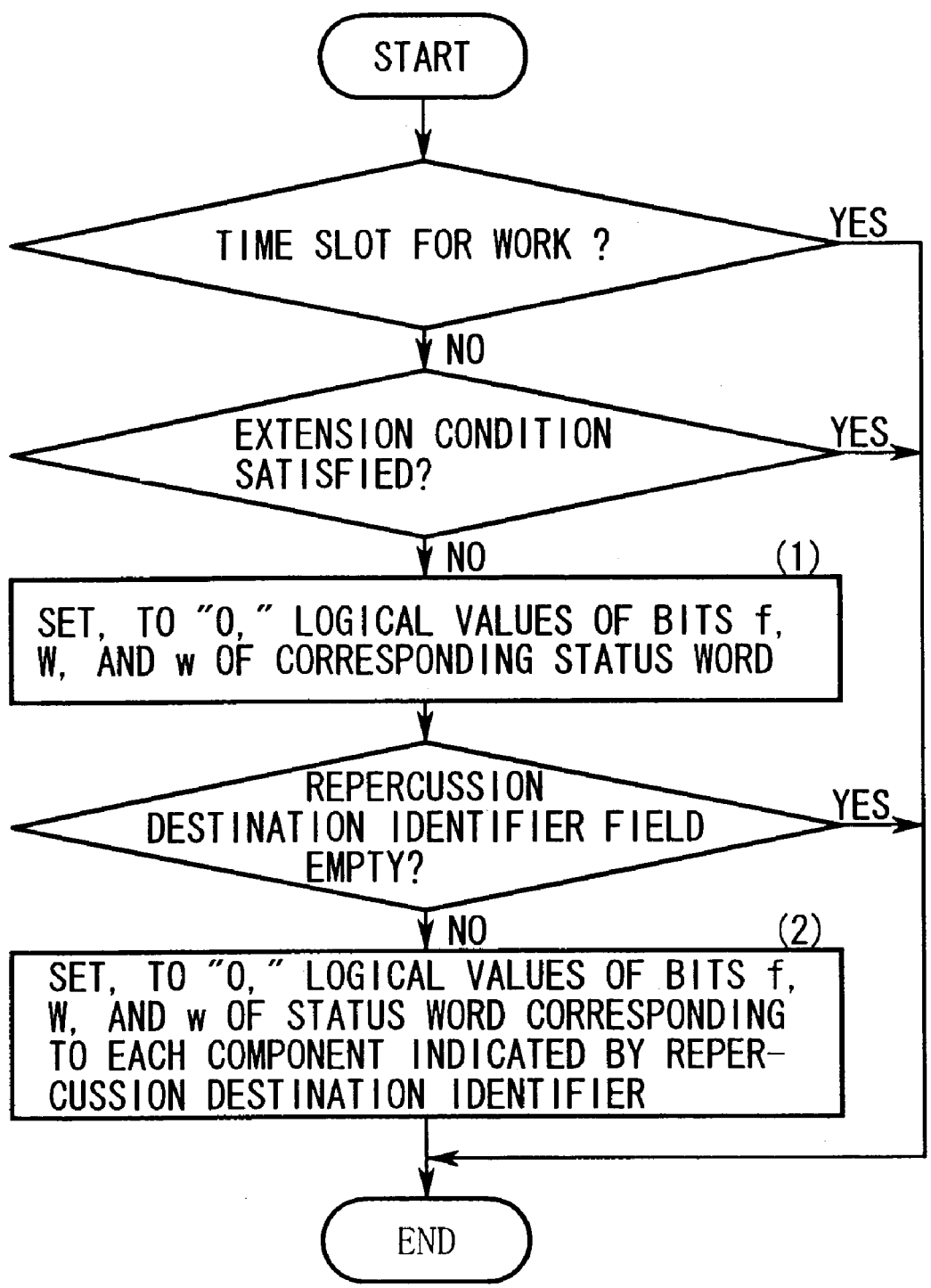
FIG. 7 is an operation flowchart of the fourth embodiment of the invention.
Figure 8:
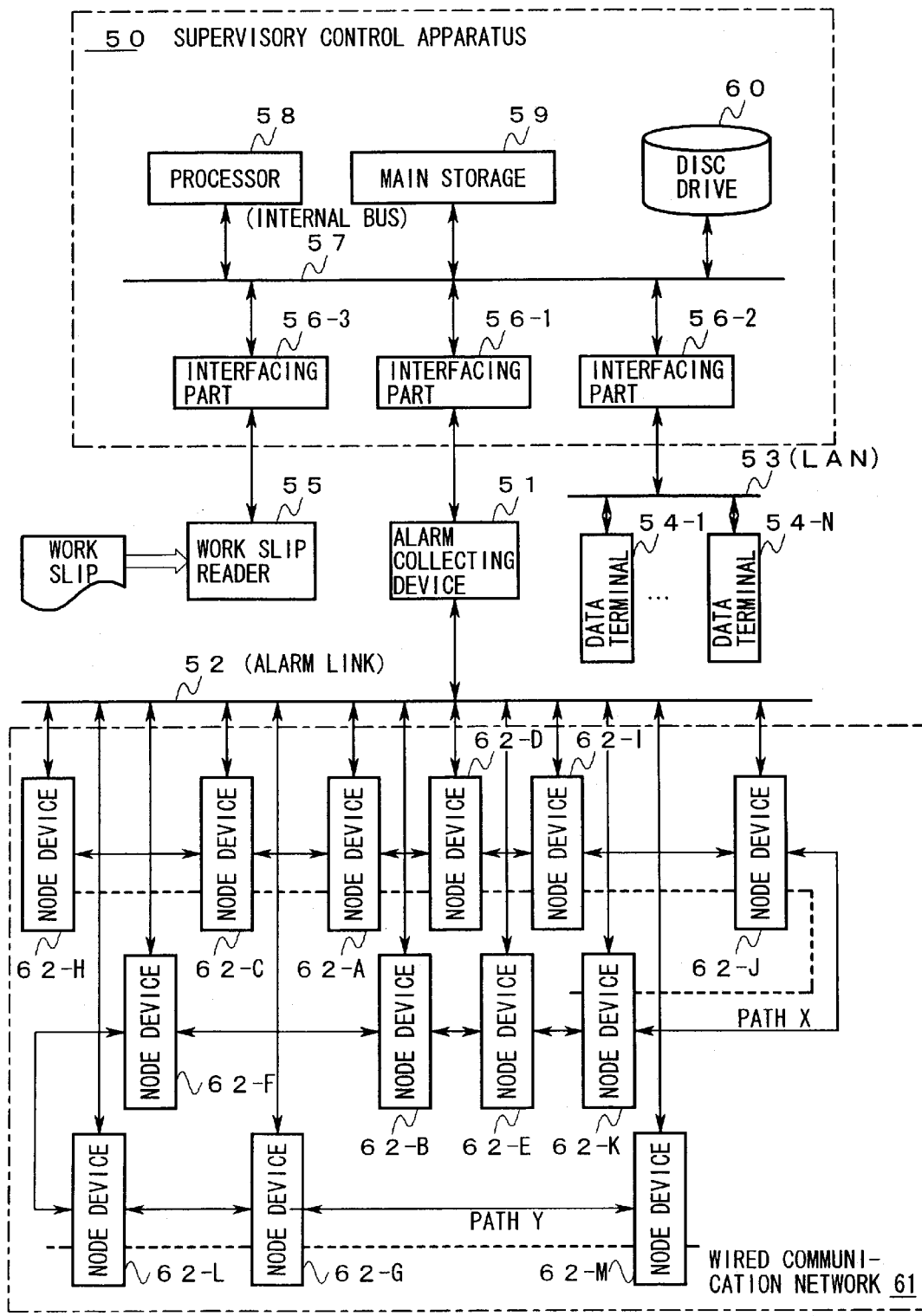
FIG. 8 shows the configurations of a communication network and a supervisory control apparatus that is used for the maintenance and operation of the communication network.

FIG. 7 is an operation flowchart of the fourth embodiment of the invention.

The operation of the fourth embodiment of the invention will be described below with reference to FIGS. 2 and 7–10.

An extension condition that is given in advance as office data for the corresponding component (resource) that is indicated by the value of the associated element identifier field is contained in advance in each extension field of the status management table 31C.

The processor 58 updates the extension conditions in accordance with a system configuration and states of the respective components (resources) as recognized during a supervisory control (indicated by symbol (24) in FIG. 2).

The processor 58 performs the following operations when the present time goes out of a time slot during which work should be done according to a work slip:
 i) Determines a record corresponding to a component (resource) as a subject of the work among the records of the status management table 31C.
 ii) Judges whether the condition that is the value of the extension condition field of the record thus determined is satisfied at present.
 iii) Skips the following operations iv) and v) when the judgment result is "true."
 iv) When the judgment result is "false," sets, to "0," the logical values of bits f, W, and w of the status word field of the record that was determined above (indicated by symbol (1) in FIG. 7).
 v) Performs the following operations on the status management table 31C:
   Performs the following operations unless the repercussion destination identifier field is empty.
   Determines all records whose element identifier field contains any of the element identifiers that are contained in the repercussion destination identifier field.
   Sets, to "0," the logical values of bits f, W, and w of the status word field of each of the records thus determined (indicated by symbol (2) in FIG. 7).
   Repeats similar operations as long as the repercussion destination identifier fields of those records contain an effective element identifier.

That is, even if work has not finished in a scheduled time slot, the extension of the work is permitted without performing complicated processing as long as the value of the extension condition field has been set properly before the end of the time slot.

Therefore, according to this embodiment, work relating to the maintenance or operation of the communication network 61 can be extended more flexibly than in the conventional example and a variety of forms of supervisory controls can be attained inexpensively with high accuracy.

In this embodiment, the logical values of bits f, W, and w of the status word are set to "0" when it has been found that an extension condition is not satisfied. However, the invention is not limited to such a case. As long as work is extended reliably if an extension condition is satisfied, processing of discarding a message that indicates a failure or fault and has been collected from the corresponding component via the alarm link 52 and the alarm collecting device 51 is performed and/or one of the following operations is performed on the record corresponding to the component as the subject of the work to be extended among the records of the status management table 31C, only during a period when the extension condition is satisfied:
 The logical values of both bits F and f of the status word are set to "0."
 The element identifier field and the repercussion destination identifier field are temporarily made empty.

In this embodiment, the extension of work is permitted only in a period when an extension condition is satisfied. However, the invention is not limited to such a case. For example, as shown in FIG. 4, the extension of work may automatically continue to be permitted until a state that the extension condition is not satisfied is detected a number of times that is equal to a value that is set, as a constant, in a number-of-times field that is added to the status management table 31C or a value of a variable that is updated as appropriate during a supervisory control.

In each other above embodiments, a failure or fault that has occurred in a certain component of the communication network 61 is prevented from spreading to a component that is lower than the former component. However, the application range of the invention is not limited to such failures or faults. The invention can similarly be applied to any events rather than such failures or faults if a supervisory control for realizing maintenance or operation is made more efficient by preventing spread of a failure or fault during the supervisory control.

In each other above embodiments, for the sake of simplicity, it is assumed that failures or faults that may occur in the components of the communication network 61 have a single form. However, in the invention, failures or faults that have occurred in the same component may be recognized separately in combination with attributes that are unique to them, examples of which are as follows:

A measurement value, a state, and other attendant information that is obtained for a location where a failure or fault has occurred.

A time slot and a frequency in or at which failures or faults have occurred.

Predetermined physical quantities (e.g., a traffic distribution, operation states of individual sections, and the degree of an overload) to which attention should be paid at the time (time slot) of occurrence of a failure or fault and an allocation state of resources (including paths).

A substantial system configuration relating to a redundant portion.

A variable that is defined as a function of all or part of the above items and is calculated when necessary.

In each of the above embodiment, a status word in which bits W and w are packed together with bits F and f is contained in each status word field of the status management table 31, 31A, 31B, or 31C to prevent, from spreading to a lower-rank component, a failure or fault that has occurred due to work in a component on which the work has been done among the components of the communication network 61. The status word is referred to in the above-described manner.

However, the invention is not limited to such a case. For example, each status word may consist of only bits F and f in the following cases. In the following cases, a failure or fault that has occurred in a component that is indicated by the value of the element identifier field of a record in which both of bits F and f have a logical value "1" among the records of the status management table 31, 31A, 31B, or 31C is negated, whereby spread of a failure or fault that has occurred in a component higher than the above component is avoided.

A failure or fault that has been caused by work may not be prevented from spreading to a lower component.

Work is done only in a state that the operation of the communication network 61 is stopped.

In each of the above embodiments, only the node devices 62-A to 62-M and the paths X and Y are subjects of a supervisory control. However, the invention is not limited to such a case. For example, all or part of the following may be subjects of a supervisory control as long as a plurality of components constitute a hierarchical structure:

Physical components of the node devices 62-A to 62-M, such as frames (racks), shelves, and packages (modules).

Presence/absence or a measurement value of a single or a plurality of signals that are obtained for each desired part of the above components.

Events that may be detected logically in a desired layer.

In each of the above-embodiments, the invention is applied to the supervisory control on the wired communication network 61 that provides dedicated lines such as the paths X and Y. However, the application range of the invention is not limited to the communication network 61; the invention can similarly be applied to the supervisory control on a radio transmission system. In this case, the radio transmission system may employ any transmission methods, zone configurations, channel allocation, channel control, modulation methods, and multiple access schemes.

In each of the above embodiments, the processor 58 acquires items that are written on a work slip via the work slip reader 55 and the interfacing part 56-3. However, such items may be supplied by another data terminal for the maintenance and operation or supplied via a communication line or a detachable storage medium that is readable by the processor 58 and in which information is stored in advance.

The invention is not limited to the above embodiments and various modifications may be made without departing from the spirit and scope of the invention. Any improvement may be made in part or all of the components.

What is claimed is:

1. A supervisory control apparatus comprising:

a system configuration storing section having registered in advance a component immediately lower to each of a plurality of components that are arranged hierarchically and constitute a predetermined system, the immediately lower-rank component being the component to which an event that occurred individually may spread;

a status storing section having storage areas for each of said plurality of components, the storage areas being registered a first status that said event has occurred individually, a second status that said event occurred in an immediately higher-rank component has spread, and a third status that does not fall under said first or second status;

a monitoring section for judging whether said event has occurred in said plurality of components, and for respectively registering said first status and said third status in storage areas corresponding to components where said event has actually occurred or then disappeared among said storage areas of said status storing section;

a repercussion destination determining section for registering said second status in storage areas corresponding to all immediately lower-rank components among said storage areas of said status storing section, said immediately lower-rank components being registered hierarchically in said system configuration storing section and being registered correspondingly to said components where said event has actually occurred; and a controlling section for recognizing results of monitoring on said plurality of components based on combinations of statuses registered in said status storing section, and for controlling said plurality of components based on said combinations, wherein said monitoring section negates an event that occurred in a component corresponding to the storage area of said status storing section which is registered said second status, from said plurality of components.

2. The supervisory control apparatus according to claim 1, wherein said event is one or both of a failure that may occur individually in said plurality of components and a variation in a state of operation that may occur in said plurality of components according to what work may be done.

3. The supervisory control apparatus according to claim 1, wherein
said system configuration storing section and said status storing section have storage areas corresponding to attributes of all events that may occur in said plurality of components, and wherein
said monitoring section, said repercussion destination determining section, and said controlling section individually recognize each actual event as a combination of the event and attributes of the event.

4. The supervisory control apparatus according to claim 2, wherein
said system configuration storing section and said status storing section have storage areas corresponding to attributes of all events that may occur in said plurality of components, and wherein
said monitoring section, said repercussion destination determining section, and said controlling section individually recognize each actual event as a combination of the event and attributes of the event.

5. The supervisory control apparatus according to claim 1, wherein
said status storing section has a source storage area that is paired with each storage area in which said second status is to be registered, said source storage area storing an identifier of a higher-rank component where a spread event occurred as a cause of registration of said second status, and wherein
said repercussion destination determining section registers an identifier of a higher-rank component where said event has actually occurred in a source storage area that is paired with a storage area in which said second status is to be registered among said storage areas of said status storing section.

6. The supervisory control apparatus according to claim 2, wherein
said status storing section has a source storage area that is paired with each storage area in which said second status is to be registered, said source storage area storing an identifier of a higher-rank component where a spread event occurred as a cause of registration of said second status, and wherein
said repercussion destination determining section registers an identifier of a higher-rank component where said event has actually occurred in a source storage area that is paired with a storage area in which said second status is to be registered among said storage areas of said status storing section.

7. The supervisory control apparatus according to claim 3, wherein
said status storing section has a source storage area that is paired with each storage area in which said second status is to be registered, said source storage area storing an identifier of a higher-rank component where a spread event occurred as a cause of registration of said second status, and wherein
said repercussion destination determining section registers an identifier of a higher-rank component where said event has actually occurred in a source storage area that is paired with a storage area in which said second status is to be registered among said storage areas of said status storing section.

8. The supervisory control apparatus according to claim 4, wherein
said status storing section has a source storage area that is paired with each storage area in which said second status is to be registered, said source storage area storing an identifier of a higher-rank component where a spread event occurred as a cause of registration of said second status, and wherein
said repercussion destination determining section registers an identifier of a higher-rank component where said event has actually occurred in a source storage area that is paired with a storage area in which said second status is to be registered among said storage areas of said status storing section.

9. The supervisory control apparatus according to claim 5, wherein
said predetermined system is constituted as a communication system, and wherein
part of said plurality of components are communication channels formed logically on physical transmission channels that constitute said communication system.

10. The supervisory control apparatus according to claim 6, wherein
said predetermined system is constituted as a communication system, and wherein
part of said plurality of components are communication channels formed logically on physical transmission channels that constitute said communication system.

11. The supervisory control apparatus according to claim 7, wherein
said predetermined system is constituted as a communication system, and wherein
part of said plurality of components are communication channels formed logically on physical transmission channels that constitute said communication system.

12. The supervisory control apparatus according to claim 8, wherein
said predetermined system is constituted as a communication system, and wherein
part of said plurality of components are communication channels formed logically on physical transmission channels that constitute said communication system.

13. The supervisory control apparatus according to claim 5, further comprising:
an attendant information storing section in which information is registered in advance, the information corresponding to all combinations of events that may occur in said plurality of components and attributes of the events, and being unique to said combinations; and
an attendant information acquiring section for acquiring information registered in said attendant information storing section corresponding to a combination of an event and attributes of the event, said event having spread to a component of said status storing section in which said second status is registered.

14. The supervisory control apparatus according to claim 6, further comprising:
an attendant information storing section in which information is registered in advance, the information corresponding to all combinations of events that may occur in said plurality of components and attributes of the events, and being unique to said combinations; and
an attendant information acquiring section for acquiring information registered in said attendant information storing section corresponding to a combination of an event and attributes of the event, said event having spread to a component of said status storing section in which said second status is registered.

15. The supervisory control apparatus according to claim 7, further comprising:

an attendant information storing section in which information is registered in advance, the information corresponding to all combinations of events that may occur in said plurality of components and attributes of the events, and being unique to said combinations; and an attendant information acquiring section for acquiring information registered in said attendant information storing section corresponding to a combination of an event and attributes of the event, said event having spread to a component of said status storing section in which said second status is registered.

16. The supervisory control apparatus according to claim 8, further comprising:

an attendant information storing section in which information is registered in advance, the information corresponding to all combinations of events that may occur in said plurality of components and attributes of the events, and being unique to said combinations; and an attendant information acquiring section for acquiring information registered in said attendant information storing section corresponding to a combination of an event and attributes of the event, said event having spread to a component of said status storing section in which said second status is registered.

17. The supervisory control apparatus according to claim 9, further comprising:

an attendant information storing section in which information is registered in advance, the information corresponding to all combinations of events that may occur in said plurality of components and attributes of the events, and being unique to said combinations; and an attendant information acquiring section for acquiring information registered in said attendant information storing section corresponding to a combination of an event and attributes of the event, said event having spread to a component of said status storing section in which said second status is registered.

18. The supervisory control apparatus according to claim 10, further comprising:

an attendant information storing section in which information is registered in advance, the information corresponding to all combinations of events that may occur in said plurality of components and attributes of the events, and being unique to said combinations; and an attendant information acquiring section for acquiring information registered in said attendant information storing section corresponding to a combination of an event and attributes of the event, said event having spread to a component of said status storing section in which said second status is registered.

19. The supervisory control apparatus according to claim 11, further comprising:

an attendant information storing section in which information is registered in advance, the information corresponding to all combinations of events that may occur in said plurality of components and attributes of the events, and being unique to said combinations; and an attendant information acquiring section for acquiring information registered in said attendant information storing section corresponding to a combination of an event and attributes of the event, said event having spread to a component of said status storing section in which said second status is registered.

20. The supervisory control apparatus according to claim 12, further comprising:

an attendant information storing section in which information is registered in advance, the information corresponding to all combinations of events that may occur in said plurality of components and attributes of the events, and being unique to said combinations; and an attendant information acquiring section for acquiring information registered in said attendant information storing section corresponding to a combination of an event and attributes of the event, said event having spread to a component of said status storing section in which said second status is registered.

21. The supervisory control apparatus according to claim 5, further comprising:

an attendant information storing section having time required for recovering from a failure registered in advance, said time individually indicated for each of said plurality of components, and said failure being any of all combinations of failures that may occur as said events and attributes of said failures; and an attendant information acquiring section for acquiring a recovery time registered in said attendant information storing section corresponding to a combination of an event and attributes of the event, said event having spread to a component of said status storing section in which said second status is registered.

22. The supervisory control apparatus according to claim 6, further comprising:

an attendant information storing section having time required for recovering from a failure registered in advance, said time individually indicated for each of said plurality of components, and said failure being any of all combinations of failures that may occur as said events and attributes of said failures; and an attendant information acquiring section for acquiring a recovery time registered in said attendant information storing section corresponding to a combination of an event and attributes of the event, said event having spread to a component of said status storing section in which said second status is registered.

23. The supervisory control apparatus according to claim 7, further comprising:

an attendant information storing section having time required for recovering from a failure registered in advance, said time individually indicated for each of said plurality of components, and said failure being any of all combinations of failures that may occur as said events and attributes of said failures; and an attendant information acquiring section for acquiring a recovery time registered in said attendant information storing section corresponding to a combination of an event and attributes of the event, said event having spread to a component of said status storing section in which said second status is registered.

24. The supervisory control apparatus according to claim 8, further comprising:

an attendant information storing section having time required for recovering from a failure registered in advance, said time individually indicated for each of said plurality of components, and said failure being any of all combinations of failures that may occur as said events and attributes of said failures; and an attendant information acquiring section for acquiring a recovery time registered in said attendant information storing section corresponding to a combination of an event and attributes of the event, said event having spread to a component of said status storing section in which said second status is registered.

25. The supervisory control apparatus according to claim 9, further comprising:

an attendant information storing section having time required for recovering from a failure registered in advance, said time individually indicated for each of said plurality of components, and said failure being any of all combinations of failures that may occur as said events and attributes of said failures; and an attendant information acquiring section for acquiring a recovery time registered in said attendant information storing section corresponding to a combination of an event and attributes of the event, said event having spread to a component of said status storing section in which said second status is registered.

26. The supervisory control apparatus according to claim 10, further comprising:

an attendant information storing section having time required for recovering from a failure registered in advance, said time individually indicated for each of said plurality of components, and said failure being any of all combinations of failures that may occur as said events and attributes of said failures; and an attendant information acquiring section for acquiring a recovery time registered in said attendant information storing section corresponding to a combination of an event and attributes of the event, said event having spread to a component of said status storing section in which said second status is registered.

27. The supervisory control apparatus according to claim 11, further comprising:

an attendant information storing section having time required for recovering from a failure registered in advance, said time individually indicated for each of said plurality of components, and said failure being any of all combinations of failures that may occur as said events and attributes of said failures; and an attendant information acquiring section for acquiring a recovery time registered in said attendant information storing section corresponding to a combination of an event and attributes of the event, said event having spread to a component of said status storing section in which said second status is registered.

28. The supervisory control apparatus according to claim 12, further comprising:

an attendant information storing section having time required for recovering from a failure registered in advance, said time individually indicated for each of said plurality of components, and said failure being any of all combinations of failures that may occur as said events and attributes of said failures; and an attendant information acquiring section for acquiring a recovery time registered in said attendant information storing section corresponding to a combination of an event and attributes of the event, said event having spread to a component of said status storing section in which said second status is registered.

29. The supervisory control apparatus according to claim 1, further comprising a permissible condition storing section in which conditions for permitting an event to spread to a lower-rank component are registered in advance for respective combinations of said plurality of components and events that may occur individually in said plurality of components, and wherein said monitoring section judges whether a condition registered in said permissible condition storing section is satisfied in each combination of an event to be negated and a component where said event has occurred, said monitoring section negating said event only when a result of the judgment is false.

30. The supervisory control apparatus according to claim 1, further comprising a permissible condition storing section in which conditions for permitting an event to spread to a lower-rank component are registered in advance for respective combinations of said plurality of components and events that may occur individually in said plurality of components, and wherein said controlling section permits, only for a combination satisfying a condition registered in said permissible condition storing section among said combinations, operation of an immediately lower-rank component to which said event constituting said combination is spread among said components registered in said system configuration storing section.

31. The supervisory control apparatus according to claim 29, wherein said monitoring section judges whether events constituting combinations corresponding to respective conditions that have been satisfied in advance among said conditions registered in said permissible condition storing section have disappeared or not, and regards conditions for which a result of the judgment is false among said conditions satisfied in advance as still being satisfied for a predetermined time.

32. The supervisory control apparatus according to claim 30, wherein said monitoring section judges whether events constituting combinations corresponding to respective conditions that have been satisfied in advance among said conditions registered in said permissible condition storing section have disappeared or not, and regards conditions for which a result of the judgment is false among said conditions satisfied in advance as still being satisfied for a predetermined time.

33. The supervisory control apparatus according to claim 31, wherein said monitoring section regards said conditions for which said result of said judgment is false as still being satisfied for said predetermined time and only for a predetermined number of times.

34. The supervisory control apparatus according to claim 32, wherein said monitoring section regards said conditions for which said result of said judgment is false as still being satisfied for said predetermined time and only for a predetermined number of times.

* * * * *